US012524989B2

(12) United States Patent
Adidharma et al.

(10) Patent No.: US 12,524,989 B2
(45) Date of Patent: Jan. 13, 2026

(54) METHOD FOR CLASSIFYING IMAGES

(71) Applicants: University of Washington, Seattle, WA (US); Seattle Children's Hospital, Seattle, WA (US)

(72) Inventors: Lingga Adidharma, Seattle, WA (US); Randall Bly, Seattle, WA (US); Christopher Young, Seattle, WA (US); Blake Hannaford, Seattle, WA (US); Ian Humphreys, Seattle, WA (US); Al-Waleed M. Abuzeid, Seattle, WA (US); Manuel Ferreira, Seattle, WA (US); Kristen S. Moe, Seattle, WA (US); Yangming Li, Rochester, NY (US); Daniel King, Seattle, WA (US)

(73) Assignees: University of Washington, Seattle, WA (US); Seattle Children's Hospital, Seattle, WA (US)

( * ) Notice: Subject to any disclaimer, the term of this patent is extended or adjusted under 35 U.S.C. 154(b) by 906 days.

(21) Appl. No.: 17/670,082

(22) Filed: Feb. 11, 2022

(65) Prior Publication Data

US 2022/0262098 A1 Aug. 18, 2022

Related U.S. Application Data

(60) Provisional application No. 63/149,042, filed on Feb. 12, 2021.

(51) Int. Cl.
*G06V 10/764* (2022.01)
*G06T 7/00* (2017.01)
(Continued)

(52) U.S. Cl.
CPC .......... *G06V 10/764* (2022.01); *G06T 7/0012* (2013.01); *G06T 7/73* (2017.01);
(Continued)

(58) Field of Classification Search
CPC .. G06V 10/761; G06V 10/762; G06V 10/764; G06V 10/82; G06V 2201/03;
(Continued)

(56) References Cited

U.S. PATENT DOCUMENTS 8,913,807 B1 * 12/2014 Horn ...................... G06V 10/56
382/128
9,456,174 B2 9/2016 Boyle et al.
(Continued)

FOREIGN PATENT DOCUMENTS

CN 102915544 A 2/2013
CN 104867161 A 8/2015
(Continued)

OTHER PUBLICATIONS

Byrnes et al., "Efficient Bronchoscopic Video Summarization", IEEE Transactions on Biomedical Engineering, vol. 66, No. 3, Mar. 2019, pp. 848-863. (Year: 2019).*
(Continued)

*Primary Examiner* — Jennifer Mehmood
*Assistant Examiner* — Jose M Torres
(74) *Attorney, Agent, or Firm* — McDonnell Boehnen Hulbert & Berghoff LLP

(57) ABSTRACT

A method includes classifying, via a computational model, images of a source image stream as valid images or invalid images based on whether the images include biological tissue or a surgical tool; and generating a condensed image stream that includes the valid images. Another method includes classifying input images as valid images or invalid images using: a clustering algorithm that classifies each of the input images into either a first group or a second group and using labels that indicate whether the input images include a surgical tool. The method also includes training a computational model to identify the valid images based on
(Continued)

whether the valid images include biological tissue or a surgical tool, or whether the valid images have at least a threshold level of clarity.

20 Claims, 12 Drawing Sheets

(51) Int. Cl.
    *G06T 7/73*         (2017.01)
    *G06T 7/90*         (2017.01)
    *G06V 10/74*       (2022.01)
    *G06V 10/762*     (2022.01)
    *G06V 10/82*       (2022.01)

(52) U.S. Cl.
    CPC .............. *G06T 7/90* (2017.01); *G06V 10/761* (2022.01); *G06V 10/762* (2022.01); *G06V 10/82* (2022.01); *G06T 2207/10016* (2013.01); *G06T 2207/10068* (2013.01); *G06T 2207/20072* (2013.01); *G06T 2207/20081* (2013.01); *G06T 2207/20084* (2013.01); *G06T 2207/30012* (2013.01); *G06T 2207/30016* (2013.01); *G06T 2207/30056* (2013.01); *G06T 2207/30096* (2013.01); *G06T 2207/30168* (2013.01); *G06V 2201/03* (2022.01)

(58) Field of Classification Search
    CPC ........... G06T 7/0012; G06T 7/73; G06T 7/90; G06T 2207/10016; G06T 2207/10024; G06T 2207/10068; G06T 2207/20072; G06T 2207/20081; G06T 2207/20084; G06T 2207/30012; G06T 2207/30016; G06T 2207/30056; G06T 2207/30096; G06T 2207/30168
    See application file for complete search history.

(56) References Cited

U.S. PATENT DOCUMENTS

| | | | |
|---|---|---|---|
| 10,729,502 B1* | 8/2020 | Wolf ....................... | A61B 5/746 |
| 2011/0046476 A1* | 2/2011 | Cinquin ............... | G09B 23/285 |
| | | | 600/424 |
| 2011/0301447 A1* | 12/2011 | Park ...................... | G06T 7/0016 |
| | | | 600/407 |
| 2016/0259888 A1* | 9/2016 | Liu ........................ | G16H 30/40 |
| 2016/0365114 A1 | 12/2016 | Galant et al. | |
| 2017/0202443 A1* | 7/2017 | Mihalca ............... | A61B 1/0684 |
| 2018/0110398 A1* | 4/2018 | Schwartz ............ | A61B 1/0002 |
| 2018/0137622 A1* | 5/2018 | Hiltl ........................ | G06T 7/248 |
| 2018/0286049 A1* | 10/2018 | Linard ................... | G06T 7/174 |
| 2018/0322949 A1* | 11/2018 | Mohr ..................... | G16H 40/63 |
| 2019/0279765 A1* | 9/2019 | Giataganas ........... | G06F 3/014 |
| 2020/0184278 A1 | 6/2020 | Zadeh et al. | |
| 2020/0226751 A1* | 7/2020 | Jin .......................... | A61B 90/37 |
| 2020/0302600 A1* | 9/2020 | Barral ..................... | G06V 20/70 |
| 2020/0337648 A1* | 10/2020 | Saripalli ................ | G06N 20/00 |
| 2021/0201047 A1 | 7/2021 | Hwangbo et al. | |
| 2021/0307841 A1 | 10/2021 | Buch et al. | |
| 2021/0313052 A1* | 10/2021 | Makrinich ............. | G11B 27/34 |
| 2022/0160433 A1* | 5/2022 | Rafii-Tari ............. | G06T 7/0012 |
| 2022/0207896 A1* | 6/2022 | Fouts .................... | G06V 10/454 |
| 2023/0316545 A1* | 10/2023 | Liu ........................ | G06V 20/48 |
| | | | 382/103 |

FOREIGN PATENT DOCUMENTS

| | | |
|---|---|---|
| CN | 107220585 A | 9/2017 |
| CN | 107729821 A | 2/2018 |
| CN | 107943837 A | 4/2018 |
| CN | 109165550 A | 1/2019 |
| CN | 110087097 A | 8/2019 |
| CN | 110765835 A | 2/2020 |
| CN | 111768469 A | 10/2020 |
| CN | 111881818 A | 11/2020 |
| WO | 2021203077 A1 | 10/2021 |

OTHER PUBLICATIONS

Loukas, "Surgical Phase Recognition of Short Video Shots Based on Temporal Modeling of Deep Features", arXiv:1807.07853, Dec. 7, 2018, pp. 1-6. (Year: 2018).*

Adidharma L, Yang Z, Young C, Li Y, Hannaford B, Humphreys I, Abuzeid wm, Ferreira M, Moe KS, Bly RA. Semiautomated method for Editing Surgical Videos. J Neurol Surg B Skull Base 2021: 82(S02): S65-S270.

Al-Jobory HK. Suggested Method for Medical Image Segmentation. J Babylon University/Pure and Applied Sciences, No. 1, vol. 2, 2012.

Alwassel H, Mahajan D, Korbar B, Torresani L, Ghanem B, Tran D. Self-Supervised Learning by Cross-Modal Audio-Video Clustering. 34th Conference on Neural Information Processing Systems (NeurIPS 2020), Vancouver, Canada.

Arthur D, Vassilvitskii S. k-means++: The Advantages of Careful Seeding. Proc Annu ACM-SIAM Symp Discret Algorithms. 2007; 8:1027-1035.

"Convolutional Neural Network." Convolutional Neural Network— MATLAB & Simulink, accessed Jul. 21, 2022 at https://www.mathworks.com/discovery/convolutional-neural-network-matlab.html.

Ernst A, Michaud G. A Video Says More Than a Thousand Words. Chest. 2009; 136(6):1447-1448. doi:10.1378/ chest.09-1920.

Fan Z, Chen C, Jiang T. A Semi-Automatic Editing Method for Surgery Videos. Proceedings of the IEEE International Conference on Multimedia and Expo Workshops (ICMEW), Jul. 10-14, 2017.

Garg, I, Kaur, B. Color Based Segmentation using K-Mean Clustering and Watershed Segmentation. 2016 3rd International Conference on Computing for Sustainable Global Development (INDIACom), 2016, pp. 3165-3169.

Tassan MR, Ema RR, Islam T. Color Image Segmentation Using Automated K-Means Clustering with RGB and HSV Color Spaces. Global J Computer Science and Technology: F Graphics & Vision, V. 17, Issue 2, Ver. 1.0, 2017.

"Online Video Editor: Smart Video Maker by Magisto." How to Make a Video with Magisto Online Video Editor. Accessed Jul. 25, 2022 at www.magisto.com/how-it-works?prev_path=%2Fabout&via=footer.

Nair MS, Mohan J. Static video summarization using multi-CNN with sparse autoencoder and random forest classifier. Signal, Image and Video Processing. 15. 10.1007/s11760-020-01791-4, Year: 2021.

Nair MS, Mohan J. Video Summarization using Convolutional Neural Network and Random Forest Classifier. TENCON 2019— 2019 IEEE Region 10 Conference (TENCON), 2019, pp. 476-480, doi: 10.1109/TENCON.2019.8929724.

Nilen E, Oswald O. Machine Learning Based Video Editing Toolbox for Automatic Summary of Medical Videos. Master's Thesis in Mathematical Sciences, Faculty of Engineering, Lund University. 2019:E25.

Podlesnyy, SY. "Automatic Video Editing." Smart Algorithms for Multimedia and Imaging, ch. 6. Springer International Publishing, 2021.

Rehim SA, Chung KC. Educational Video Recording and Editing for the Hand Surgeon. J Hand Surg Am. May 2015; 40(5): 1048-1054. doi:10.1016/j.jhsa.2014.08.021.

Rublee E, Rabaud V, Konolige K, Bradski G. ORB: an efficient alternative to SIFT or SURF. 2011 International Conference on Computer Vision, 2011, pp. 2564-2571, doi: 10.1109/ICCV.2011.6126544.

Scollato A, Perrini P, Benedetto N, Di Lorenzo N. A professional and cost effective digital video editing and image storing system for the operating room. J Neurosurgical Sciences, 51(2) 103-6, Year: 2007.

(56) References Cited

OTHER PUBLICATIONS

Xin M, Wang Y. Research on image classification model based on deep convolution neural network. EURASIP Journal on Image and Video Processing, 2019:40. https://doi.org/10.1186/s13640-019-0417-8.

\* cited by examiner

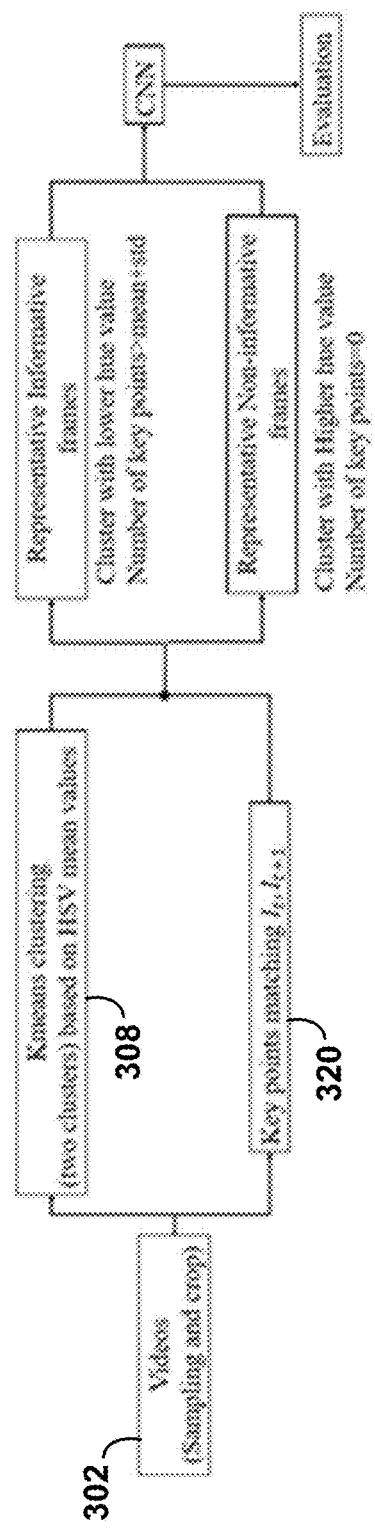
FIG. 2
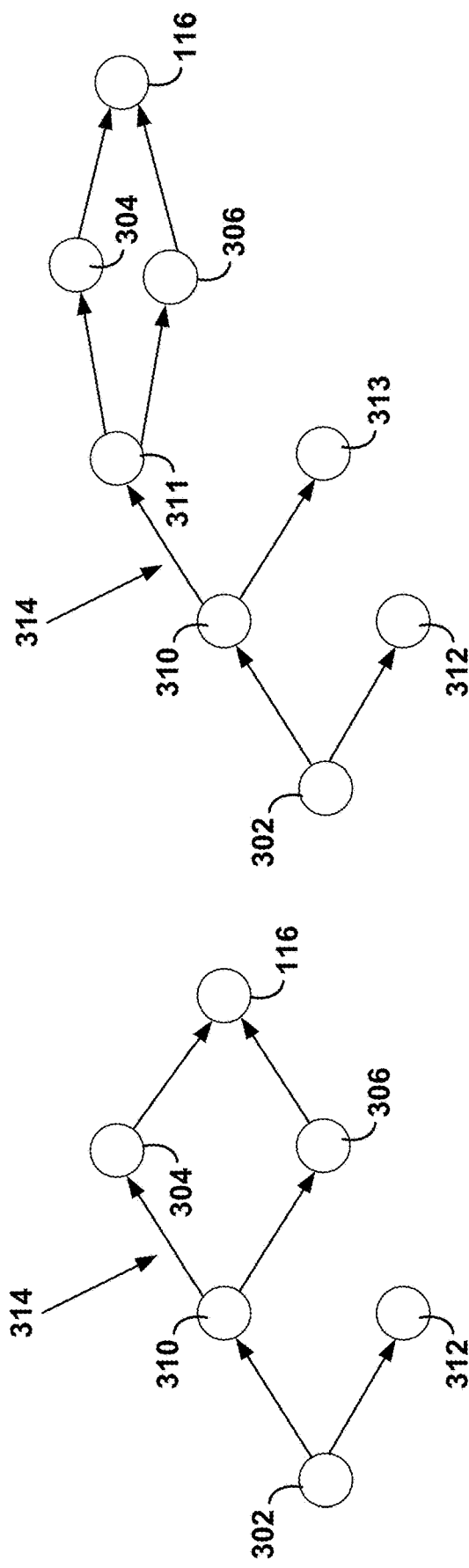
FIG. 4
FIG. 3

CLASSIFYING INPUT IMAGES AS VALID IMAGES OR INVALID IMAGES USING: A CLUSTERING ALGORITHM THAT CLASSIFIES EACH OF THE INPUT IMAGES INTO EITHER A FIRST GROUP OR A SECOND GROUP AND LABELS THAT INDICATE WHETHER THE INPUT IMAGES INCLUDE A SURGICAL TOOL

202

TRAINING A COMPUTATIONAL MODEL TO IDENTIFY THE VALID IMAGES BASED ON WHETHER THE VALID IMAGES INCLUDE BIOLOGICAL TISSUE OR A SURGICAL TOOL, OR WHETHER THE VALID IMAGES HAVE AT LEAST A THRESHOLD LEVEL OF CLARITY

| Irrelevance | Video 6 | Video 7 | Video 8 | Video 9 | Average |
|---|---|---|---|---|---|
| Magisto | 0.27 | 0.44 | 0.55 | 0.43 | 0.42 |
| Our Method | 0.11 | 0.15 | 0.07 | 0.19 | 0.13 |
| Improvement | 0.16 | 0.29 | 0.48 | 0.25 | 0.29 |

FIG. 13

| Medically important actions | Video 6 | Video 7 | Video 8 | Video 9 | Average Sensitivity |
|---|---|---|---|---|---|
| Drilling to expose tumor | | 1 | 1 | 1 | |
| Removing floor of sella | | 1 | 1 | 1 | |
| Cutting tumor capsule/dura | | | 0 | 1 | |
| Tumor resection | 1 | 0.5 | 1 | 1 | |
| Check for tumor | 1 | | | | |
| Visualize optic nerve | | | 0 | | |
| Controlling bleed | 1 | 1 | 1 | | |
| Sizing fascia | 1 | | 1 | | |
| sella reconstruction (bone graft) | 1 | 1 | 1 | 1 | |
| Fibrin glue | | 0.5 | | | |
| Flap | 1 | | 1 | 1 | |
| Our Algorithm | 1.00 | 0.83 | 0.75 | 1.00 | 0.90 |
| Frame Removed Random Choice | 0.60 | 0.50 | 0.63 | 0.83 | 0.64 |
| Performance | 0.20 | 0.42 | 0.44 | 0.50 | 0.39 |

FIG. 14

METHOD FOR CLASSIFYING IMAGES

CROSS REFERENCE TO RELATED APPLICATION

The present application is a non-provisional application claiming priority to U.S. provisional application No. 63/149,042, filed Feb. 12, 2021, the contents of which are hereby incorporated by reference.

BACKGROUND

Surgical videos are commonly used for trainee education, academic publications, and conference presentations. Condensing surgical videos to include only informative scenes can be a largely manual, tedious, and lengthy process. Current automated techniques for condensing surgical videos generally do not provide quality results. That is, informative scenes are omitted and non-informative scenes are included too often.

SUMMARY

A first example includes a method comprising: classifying, via a computational model, images of a source image stream as valid images or invalid images based on whether the images include biological tissue or a surgical tool; and generating a condensed image stream that includes the valid images.

A second example includes a computing device comprising: one or more processors; and a computer readable medium storing instructions that, when executed by the one or more processors, cause the computing device to perform functions comprising: classifying, via a computational model, images of a source image stream as valid images or invalid images based on whether the images include biological tissue or a surgical tool; and generating a condensed image stream that includes the valid images.

A third example includes a non-transitory computer readable medium storing instructions that, when executed by a computing device, cause the computing device to perform functions comprising: classifying, via a computational model, images of a source image stream as valid images or invalid images based on whether the images include biological tissue or a surgical tool; and generating a condensed image stream that includes the valid images.

A fourth example includes a method comprising: classifying input images as valid images or invalid images using: a clustering algorithm that classifies each of the input images into either a first group or a second group; and labels that indicate whether the input images include a surgical tool; and training a computational model to identify the valid images based on whether the valid images include biological tissue or a surgical tool, or whether the valid images have at least a threshold level of clarity.

A fifth example includes a computing device comprising: one or more processors; and a computer readable medium storing instructions that, when executed by the one or more processors, cause the computing device to perform functions comprising: classifying input images as valid images or invalid images using: a clustering algorithm that classifies each of the input images into either a first group or a second group; and labels that indicate whether the input images include a surgical tool; and training a computational model to identify the valid images based on whether the valid images include biological tissue or a surgical tool, or whether the valid images have at least a threshold level of clarity.

A sixth example includes a non-transitory computer readable medium storing instructions that, when executed by a computing device, cause the computing device to perform functions comprising: classifying input images as valid images or invalid images using: a clustering algorithm that classifies each of the input images into either a first group or a second group; and labels that indicate whether the input images include a surgical tool; and training a computational model to identify the valid images based on whether the valid images include biological tissue or a surgical tool, or whether the valid images have at least a threshold level of clarity.

When the term "substantially" or "about" is used herein, it is meant that the recited characteristic, parameter, or value need not be achieved exactly, but that deviations or variations, including, for example, tolerances, measurement error, measurement accuracy limitations, and other factors known to those of skill in the art may occur in amounts that do not preclude the effect the characteristic was intended to provide. In some examples disclosed herein, "substantially" or "about" means within +/−0-5% of the recited value.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

BRIEF DESCRIPTION OF THE DRAWINGS

FIG. 2 is a schematic diagram of functionality related to training a computational model, according to an example embodiment.

FIG. 3 is a schematic diagram of functionality related to training a computational model, according to an example embodiment.

FIG. 4 is a schematic diagram of functionality related to training a computational model, according to an example embodiment.

FIG. 5 is a block diagram of a method, according to an example embodiment.

FIG. 13 depicts information related to prediction tools, according to an example embodiment.

FIG. 14, depicts results of a prediction tool, according to an example embodiment.

DETAILED DESCRIPTION

As discussed above, improved techniques for condensing surgical videos are needed. To this end, this disclosure includes examples of training a computational model to identify valid (e.g., informative) images within an image stream and includes examples of using such a trained computational model to identify valid images in unlabeled image streams.

Within examples, a method for training a computational model includes classifying input images as valid images or invalid images using a clustering algorithm that classifies each of the input images into either a first group or a second group. When provided input images depicting surgeries, the clustering algorithm tends to sort the input images into a first group of clear images in which red hue corresponding to biological tissue of the patient is prevalent and a second group of blurry images and/or images lacking this prevalence of red hue. In some examples, the biological tissue being operated on includes a different hue, and the clustering algorithm will tend to use that hue as a basis for classification. Classifying the input images into valid images or invalid images also involves using labels that indicate whether the input images include a surgical tool (e.g., a suction tool, a forceps, a microdebrider, a drill, and/or a ring curette). The method also includes training a computational model to identify the valid images based on whether the valid images include biological tissue and/or a surgical tool, and/or whether the valid images have at least a threshold level of clarity. After training, the model can be used to classify and condense unlabeled image streams for brevity and enhanced usefulness. Images that include biological tissue and/or a surgical tool, and/or that have a threshold level of clarity are more likely to be useful (e.g., for educational purposes).

As such, another method includes classifying, via a computational model, images of a source image stream as valid images or invalid images based on whether the images include biological tissue or a surgical tool, and generating a condensed image stream that includes the valid images.

Figure 1:
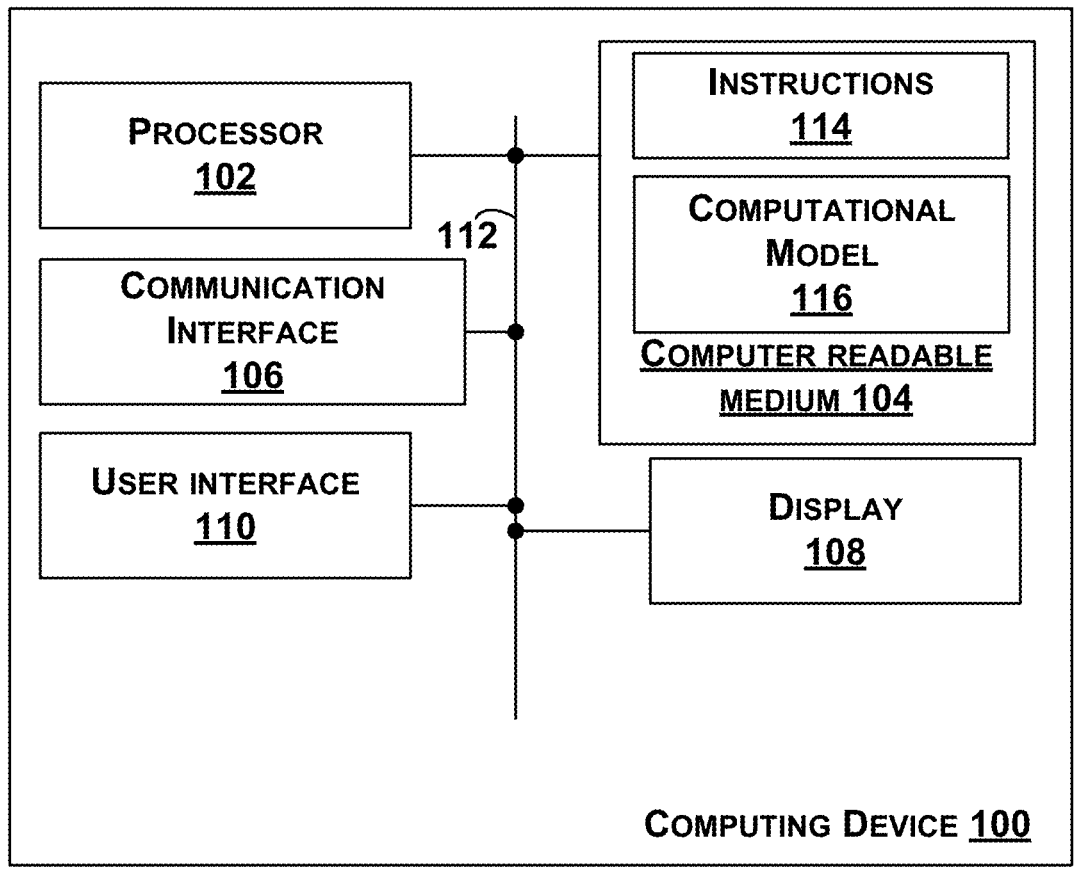
FIG. 1 is a schematic diagram of a computing device, according to an example embodiment.

FIG. 1 is a block diagram of a computing device 100. The computing device 100 includes one or more processors 102, a non-transitory computer readable medium 104, a communication interface 106, a display 108, and a user interface 110. Components of the computing device 100 are linked together by a system bus, network, or other connection mechanism 112.

The one or more processors 102 can be any type of processor(s), such as a microprocessor, a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 can be configured to store instructions 114. The instructions 114 are executable by the one or more processors 102 to cause the computing device 100 to perform any of the functions or methods described herein.

The non-transitory computer readable medium 104 can also be configured to store a computational model 116. The computational model 116 can take the form of a convolutional neural network or any other type of artificial neural network. The computational model 116 can take other forms as well.

The communication interface 106 can include hardware to enable communication within the computing device 100 and/or between the computing device 100 and one or more other devices. The hardware can include transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices. The communication interface 106 can also include analog-to-digital converters (ADCs) or digital-to-analog converters (DACs) that the computing device 100 can use to control various components of the monitoring system 100.

The display 108 can be any type of display component configured to display data. As one example, the display 108 can include a touchscreen display. As another example, the display 108 can include a flat-panel display, such as a liquid-crystal display (LCD) or a light-emitting diode (LED) display.

The user interface 110 can include one or more pieces of hardware used to provide data and control signals to the computing device 100. For instance, the user interface 110 can include a mouse or a pointing device, a keyboard or a keypad, a microphone, a touchpad, or a touchscreen, among other possible types of user input devices. Generally, the user interface 110 can enable an operator to interact with a graphical user interface (GUI) provided by the computing device 100 (e.g., displayed by the display 108).

FIG. 2 and FIG. 3 are schematic diagrams of functionality related to training the computational model 116. The computing device 100 classifies input images 302 as valid images 304 or invalid images 306 (1) using a clustering algorithm 308 that classifies each of the input images 302 into either a first group 310 or a second group 312 and (2) using labels 314 that indicate whether the input images 302 include a surgical tool.

The input images 302 are digital video frames from one or more video recordings depicting surgical procedures. That is, many of the input images 302 depict a surgeon or a surgical robot performing incisions or other surgical techniques upon biological tissue of a (e.g., human) patient. The input images 302 can be visible light images captured with an endoscope or a general purpose camera, for example.

In various examples, the biological tissue is any tissue encountered during any type of surgery. The biological tissue can include one or more of brain tissue, tumors, lesions, damaged tissue near the brain or spine, liver, viscera, the nasal septum, or sinuses. Similarities of soft tissue appearances (e.g., due to hemoglobin) can be leveraged by the algorithm to classify images based on hues. Large color differences between inside and outside the patient's body can be used to eliminate unimportant imagery outside the body.

The computing device 100 classifies the input images 302 into the valid images 304 and the invalid images 306 so that the valid images 304 and the invalid images 306 can be used to train the computational model 116 to classify unlabeled images as either valid or invalid. Valid images are generally deemed suitable for inclusion in a condensed image stream of a surgical procedure that can be used for educational purposes while invalid images are generally deemed not suitable for inclusion. Attributes of the valid images 304 and the invalid images 306 are discussed in more detail below.

The clustering algorithm 308 generally takes the form of a k-means clustering algorithm or a Gaussian mixture model. In the k-means example, generally k=2 and the clustering algorithm 308 sorts the input images 302 exclusively into either the first group 310 or the second group 312. When the input images 302 are surgical videos, the clustering algorithm 308 generally detects differences in hue, saturation, and brightness of pixels according to the HSV color model. More specifically, the first group 310 generally includes images having a threshold level of clarity and/or depicting the (e.g., blood rich red or brown liver tissue) biological tissue of the patient. Thus, the second group 312 generally includes images that are more blurry and/or that do not depict the biological tissue of the patient.

When provided a video depicting a surgical procedure, the clustering algorithm 308 tends to identify pixels within the input images 302 that have reddish hue and/or high levels of saturation and/or high levels of brightness, which tends to correlate with the biological tissue of the patient. More specifically, the clustering algorithm 308 will typically operate such that a first average level of red hue of the first group 310 is greater than a second average level of red hue of the second group 312. Levels of red hue can be defined as a quantity of pixels of an image that have a hue (H) value that is within the ranges of 170 to 180 or 0 to 10. Thus, the first average level of red hue can be equal to the number of pixels that fall within those ranges, averaged across the first group 310 and the second average level of red hue can be equal to the number of pixels that fall within those ranges, averaged across the second group 312. Similar principles and ranges can be applied to other color models such as RGB. In some examples, the clustering algorithm will appear to sort images based on a hue other than red (e.g., brown, gray, white, or pink) if the surgical procedure depicted is related to a biological tissue having a different hue. For example, biological tissue of a cadaver may appear gray or white, some tissues may appear pink, and bone tissue may appear white or gray. The clustering algorithm 308 will also tend to place clear images into the first group 310 and blurry images into the second group 312.

The computing device 100 also receives the labels 314 for analysis. The labels 314 can be attached as metadata to the input images 302 and indicate whether or not each of the input images 302 includes (e.g., depicts) a surgical tool, such as a suction tool, a forceps, a microdebrider, a drill, or a ring curette. Thus, the computing device 100 can use the presence or non-presence of a surgical tool as a basis for classifying the input images 302 as the valid images 304 or the invalid images 306. The labels 314 are generally assigned to the input images 302 manually by human inspection. It should be noted that the input images 302 could be classified according to the presence of a surgical tool prior to classifying the input images 302 using the clustering algorithm 308.

Next, the computing device 100 trains the computational model 116 to identify the valid images 304 based on whether the valid images 304 include biological tissue and/or a surgical tool, and/or whether the valid images 304 have at least a threshold level of clarity. That is, the computational model 116 evaluates the valid images 304 to identify common attributes of the valid images 304 and common attributes of the invalid images 306 and to use those attributes to identify unlabeled images as valid or invalid. Biological tissue (e.g., red hue or another hue that is characteristic of the biological tissue) being present and a surgical tool being present in an unlabeled image each makes it more likely that the computational model 116 will label that unlabeled image as valid. The unlabeled image having some threshold level of clarity also makes it more likely that the computational model 116 will label that unlabeled image as valid. When provided surgical videos, the clustering algorithm 308 also tends to classify the input images 302 having the threshold level of clarity into the first group 310. Image clarity can be examined using an additional training layer as well.

FIG. 4 is a schematic diagram of functionality related to training the computational model 116. In FIG. 4, an additional training layer is added compared to FIG. 3. Here, the computing device 100 classifies the input images 302 into the first group 310 and the second group 312 using the clustering algorithm 308, as discussed above. Next, the computing device 100 classifies the first group 310 into a third group 311 of images that depict a surgical tool and a fourth group 313 of images that do not depict a surgical tool. Lastly, the computing device 100 classifies the third group 311 into the valid images 304 and the invalid images 306 using a feature detection algorithm 320. In some examples, the feature detection algorithm 320 could be performed before the clustering algorithm 308 and the surgical tool identification step, or between those steps.

The feature detection algorithm 320 identifies the valid images 304 having at least a threshold quantity of identifiable features such as edges, dots, forked veins, lines, blobs, gradients, lines, spatial frequencies, textures, blur, active bleeding etc.). For example, the threshold quantity could be at least one standard deviation greater than the mean number of identifiable features of the input images 302 or the third group 311, depending on the ordering of the training layers. Filtering images lacking some amount of features out of the valid images 304 will tend to improve the clarity and informative nature of the valid images 304.

FIG. 5 is a block diagram of a method 200 for training the computational model 116. As shown in FIG. 5, the method 200 includes one or more operations, functions, or actions as illustrated by blocks 202 and 204. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 202, the method 200 includes classifying the input images 302 as the valid images 304 or the invalid images 306 using: the clustering algorithm 308 that classifies each of the input images 302 into either the first group 310 or the second group 312 and labels 314 that indicate whether the input images 302 include a surgical tool. Block 202 is described above with reference to FIGS. 2-4.

At block 204, the method 200 includes training the computational model 116 to identify the valid images 304 based on whether the valid images 304 include biological tissue or a surgical tool, or whether the valid images 304 have at least a threshold level of clarity. Block 204 is described above with reference to FIGS. 2-4.

Figure 6:
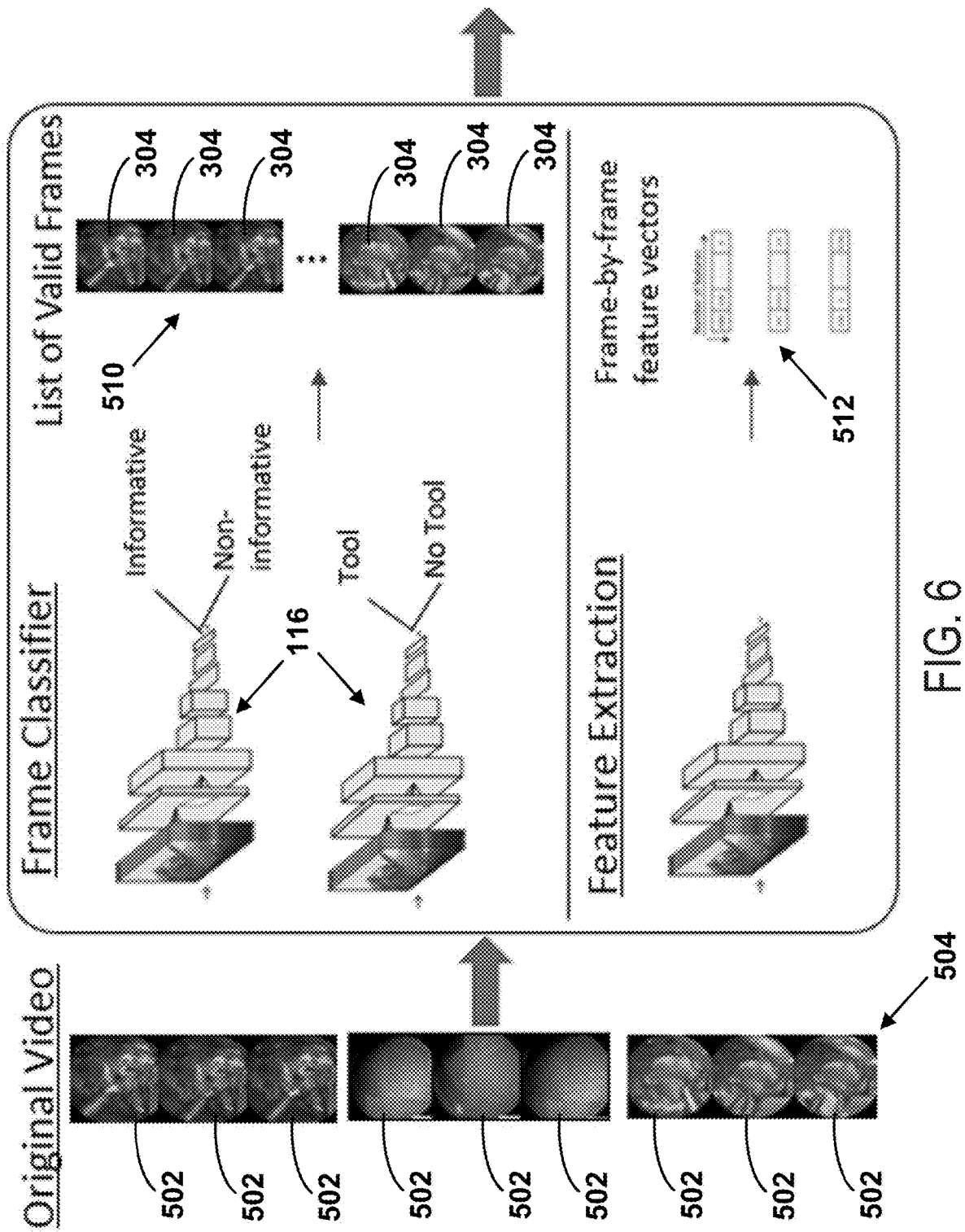
FIG. 6 is a schematic diagram of functionality related to generating a condensed image stream, according to an example embodiment.

FIG. 6 is a schematic diagram of functionality related to using the computational model 116 to generate a condensed image stream 510. The computing device 100 (e.g., an instance of the computing device 100 different from the instance discussed above with reference to FIGS. 2-5) classifies, via the computational model 116, (e.g., unlabeled) images 502 of a source image stream 504 as valid images 304 or invalid images 306 (not shown in FIG. 6) based on whether the images 502 include a biological tissue or a surgical tool.

The source image stream 504 is generally a long surgical video (e.g., 2-3 hours) that would benefit from being condensed into a shorter more informative format. As noted above, the computational model 116 was trained using images labeled by the clustering algorithm 308 and/or labeled by the feature detection algorithm 320. Additionally, the computational model 116 was trained using images (e.g., manually) labeled as including or not including a surgical tool, such as a suction tool, a forceps, a microdebrider, a drill, or a ring curette.

Thus, an image 502 depicting biological tissue (e.g., having at least a threshold level of red hue or another hue associated with the biological tissue) makes it more likely that the computational model 116 will classify the image 502 as a valid image 304. The image 502 including a surgical tool also makes it more likely that the computational model 116 will classify the image 502 as a valid image 304. The image 502 having a threshold quantity of identifiable features (e.g., at least a threshold level of clarity) also makes it more likely that the computational model 116 will classify the image 502 as a valid image 304.

The computing device 100 also generates the condensed image stream 510 that includes the valid images 304. For example, the computing device 100 generates a video file that includes (e.g., only) the valid images 304. In some examples, the condensed image stream 510 also includes metadata indicating interesting portions of the condensed image stream 510, as described below.

To create such metadata, the computing device 100 generates feature vectors 512 (e.g., fingerprints) for each of the valid images 304. In some examples, the feature vectors 512 are 256-dimensional feature vectors. The feature vectors 512 include numbers that characterize the valid images 304 with respect to 256 criteria, for example.

Figure 7:
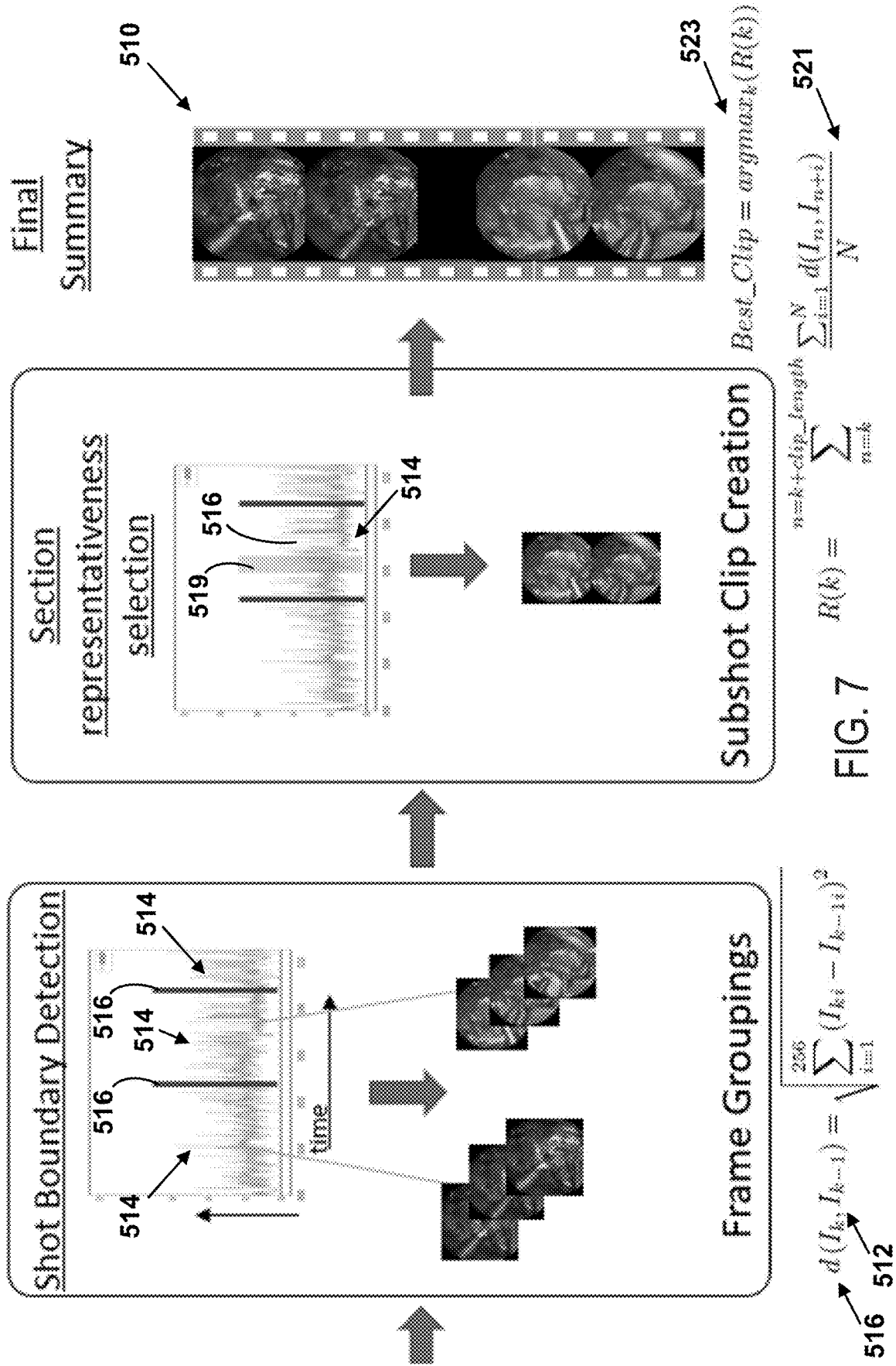
FIG. 7 is a schematic diagram of functionality related to generating a condensed image stream, according to an example embodiment.

Referring to FIG. 7, the computing device 100 identifies subsets 514 of the valid images 304 (e.g., shown as subsets of distances 516 between feature vectors 512) by comparing the feature vectors 512, which is described in more detail below. In this way, the condensed image stream 510 identifies (e.g., via metadata such as bookmarks) the subsets 514 of the valid images 304. In some examples, the subsets 514 of the valid images 304 can correspond to distinguishable phases or techniques of a surgical procedure depicted by the condensed video stream 510.

For example, the computing device 100 compares the feature vectors 512 respectively corresponding to the valid images 304 (e.g., corresponding to discrete moments in time) by identifying distances 516 between consecutive pairs of the feature vectors 512 that exceed a threshold distance. As described herein, "consecutive pairs" means feature vectors 512 that represent valid images 304 that are consecutive in time within the condensed image stream 510. The threshold distance will generally be defined based on the format of the feature vectors 512 and/or how a user has defined them. For example, a change vector can be computed by subtracting the feature vectors of consecutive images. If that magnitude exceeds a relative threshold such as 50% of the magnitude of the minuend or subtrahend vector or an absolute threshold such as 100 units, then a significant change is detected. The distances 516 can be calculated using the equation shown in the lower left panel of FIG. 7 or a similar (e.g., Euclidian distance) equation for feature vectors having other dimensions. Large distances between consecutive pairs of the feature vectors 512 can indicate an abrupt change in the corresponding valid images 304 (e.g., quick movement of a surgical tool or a camera).

In some examples, it may be useful to ignore very quick changes in the valid images 304 indicated by large distances between consecutive pairs of the feature vectors 512. For example, abrupt movement of the surgical tool or camera could be unintentional or the abrupt change could be due to a surge in lighting conditions or a focus setting, and not due to an actual change in phase of the surgical procedure. Thus, the computing device 100 can apply a low pass filter to the feature vectors 512 to smooth out such abrupt changes in distance to help ensure that (e.g., only) significant or lasting changes in the surgical procedure are identified.

Additionally, it can be useful to identify sub-segments 519 (e.g., short video clips) of the subsets 514 that can serve as an abbreviated summary of each subset 514 of the valid images 304. Thus, the computing device 100 evaluates (e.g., adds or averages or finds a median), for each valid image 304 of each subset 514, distances 516 between the valid image 304 and each other valid image 304 of the subset 514 and identifies a sub-segment 519 of the subset 514 of the valid images 304 having a predetermined (e.g., user specified) number of images and that has a minimum sum, minimum median, or minimum average of the distances 516. Equations 521 and 523 can be used in this process.

Figure 8:
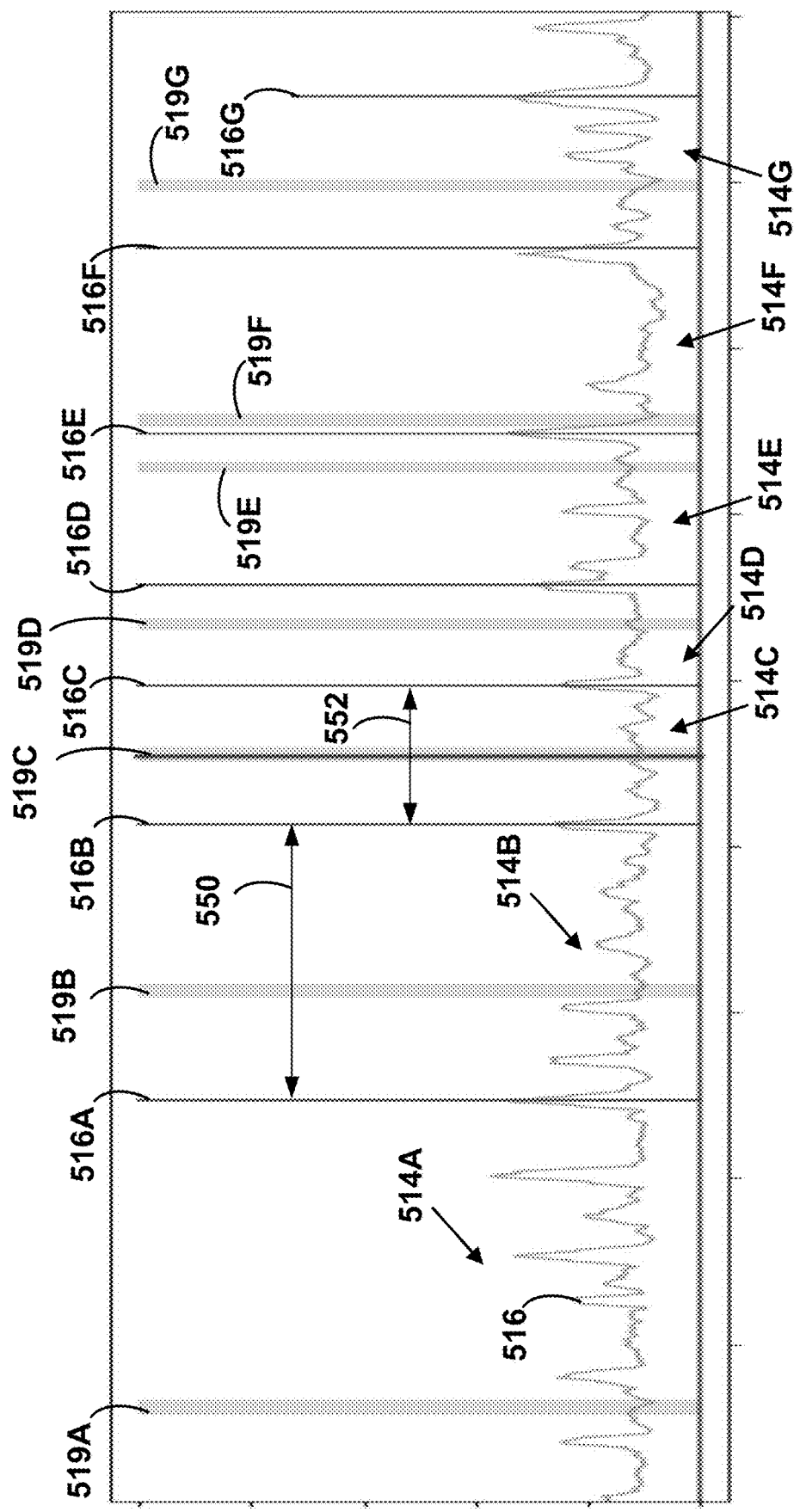
FIG. 8 is a schematic diagram of functionality related to generating a condensed image stream, according to an example embodiment.

Referring to FIG. 8, the computing device 100 identifies a number of distances 516 between feature vectors 512 that represent significant changes in corresponding valid images 304, resulting in subsets 514 of the valid images. Additionally, the computing device 100 identifies a number of sub-segments 519 that serve respectively as summary clips for the subsets 514.

More particularly, the computing device 100 identifies the sub-segment 519A that represents subset 514A having an end denoted by the distance 516A, the sub-segment 519B that represents subset 514B having an end denoted by the distance 516B, the sub-segment 519C that represents subset 514C having an end denoted by the distance 516C, the sub-segment 519D that represents subset 514D having an end denoted by the distance 516D, the sub-segment 519E that represents subset 514E having an end denoted by the distance 516E, the sub-segment 519F that represents subset 514F having an end denoted by the distance 516F, and the sub-segment 519G that represents subset 514G having an end denoted by the distance 516G.

For example, the computing device 100 identifies the distance 516A between a consecutive pair of the feature vectors 512 that exceeds a threshold distance, denoting a scene change from the subset 514A to the subset 514B. Additionally, the computing device 100 identifies the distance 516B between a consecutive pair of the feature vectors 512 that exceeds a threshold distance, denoting a scene change from the subset 514B to the subset 514C. As shown, the consecutive pair of feature vectors that denote the boundary between the subset 514B and the subset 514C chronologically follows the consecutive pair of feature vectors 512 that denote the boundary between the subset 514A and the subset 514B. To help with accuracy, the computing device 100 confirms that at least a (e.g., user selected) threshold duration 550 has passed between the distance 516A and 516B, so that subset boundaries are not too close together in time.

In a similar fashion, the computing device 100 identifies the distance 516C between a consecutive pair of the feature vectors 512 that exceeds a threshold distance, denoting a scene change from the subset 514C to the subset 514D. As shown, the consecutive pair of feature vectors that denote the boundary between the subset 514C and the subset 514D chronologically follows the consecutive pair of feature vectors 512 that denote the boundary between the subset 514B and the subset 514C. To help with accuracy, the computing device 100 confirms that the duration 550 separating the distance 516A and the distance 516B exceeds the duration 552 that separates the distance 516B and the distance 516C. It has been shown that informative scene changes actually occur more often toward the end of the condensed image stream 510.

In another example, the computing device 100 confirms that the distance 516E is greater than the distance 516D. It has been shown that increasing the threshold distance closer to the end of the condensed image stream 510 can more accurately identify scene boundaries, as surgeons are often busiest near the end of a procedure.

Figure 9:
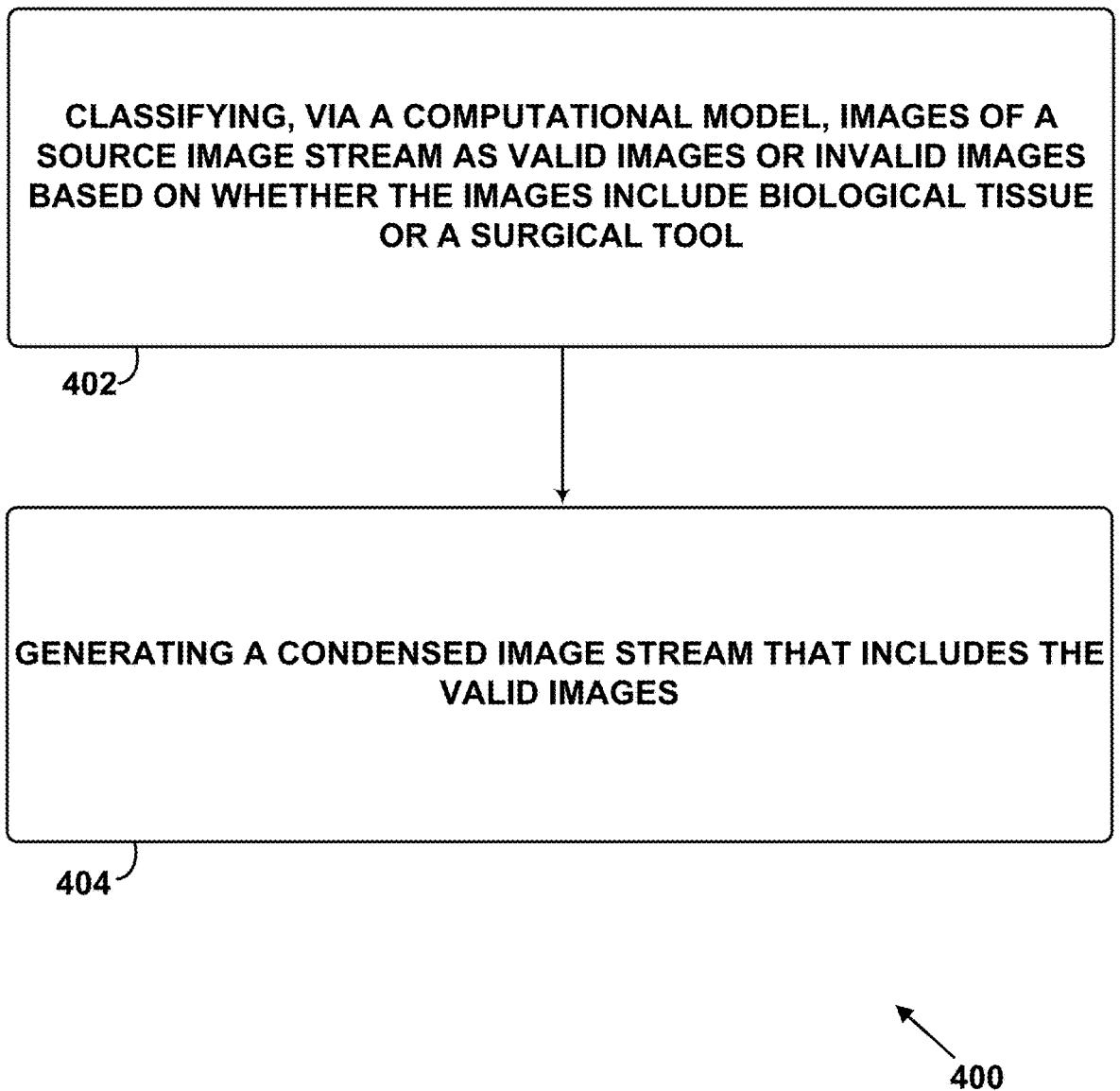
FIG. 9 is a block diagram of a method, according to an example embodiment.

FIG. 9 is a block diagram of a method 400 for generating the condensed image stream 510. As shown in FIG. 9, the method 400 includes one or more operations, functions, or actions as illustrated by blocks 402 and 404. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 402, the method 400 includes the computing device 100 classifying, via the computational model 116, the images 502 of the source image stream 504 as the valid images 304 or the invalid images 306 based on whether the images 502 include biological tissue or a surgical tool. This functionality is described above with reference to FIGS. 6-8.

At block 404, the method 400 includes the computing device 100 generating the condensed image stream 510 that includes the valid images 304. This functionality is described above with reference to FIGS. 6-8.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

Additional Examples

Endonasal Surgery is a medical procedure that utilizes an endoscopic video camera to provide an internal patient view. Despite the existence of camera data, this information is seldom reviewed or even saved in patient files due to the extreme size and length of the video data, which can include multiple hours of content. We suggest a novel multi-stage video summarization procedure utilizing semantic features and video frame temporal correspondences to create a representative summarization. This was compared to commercial software, a general video summarization tool not tailored to endonasal surgical videos. Finally, this proved capable of achieving a 98.2% reduction in overall video length while preserving 87% of key medical scenes on our data set, while the commercial tool only preserved 38% of similar length summaries.

Surgical video review is an important part of medical publication, conferences, and trainee education. Further, surgical video has the capability of forming an objective, detailed historical record of surgery. However, surgical video is seldom saved or reviewed in active detail. Surgeries can commonly exceed 7 hours, making manual review of these videos tedious and time intensive. Therefore, it is beneficial both for learning purposes and patient record review to generate automatic summaries of videos. This paper presents a video summarization method that outperforms commercial technologies based on semantic information inherent to endonasal surgery.

A postprocessing CNN was trained by separating frames into those 'Inside' and 'Outside' the patient by K-means separation in the HSV domain. Furthermore, blurry or unusable scenes were further separated by ORB keypoint grouping. The end result was a 2-stage process in which a user processed a video, then further reduced the output video by means of a second-stage frame remover. This disclosure includes an end-to-end single software pipeline capable of accepting any endosurgical input video and generating an output summary.

Referring to FIG. 6, Video is split for frame-by-frame analysis in which only valid frames are kept. Consecutively, each frame is featurized by a CNN. Then, Boundaries are detected by analyzing the L2 distance of the feature vectors. Next, shots are selected with lowest mean distance. Finally, the video is combined into a final summary.

The Video Summarization task is broken up into several sub-problems:
1. Frame-by-Frame Removal of irrelevant scenes
2. Frame-by-Frame feature vector extraction
3. Shot Boundary Detection
4. Subshot Selection
5. Combination into Final Summary Obscure Frame Removal To reduce video size into its relevant parts, first Blurry and non-Operative frames (frames outside the patient) were removed through a trained CNN. To preserve a reasonable frame fidelity while balancing calculation time, each video was sampled at 5 Hz.

Tool-Less Frame Removal

The vast majority of key medically relevant events within a video occur during surgeon action. It is rare that a video must preserve a scene in which the surgeon is not directly affecting a frame. Therefore tool-less frames were removed similarly to the Obscure Frame removal CNN training using manually segregated scenes from four diverse representative surgical videos. Examples of "relevant" tools accepted by this neural network are: Suction Tool, Forceps, Microdebrider, Drill, and Ring Curette.

Video Frame Shot Boundary Detection

Feature Extraction

In the endonasal surgical video case, there is a natural boundary between surgical scenes caused by the rapid movement of the endoscope. Scenes of extended, similar actions are generally followed by a removal of the endoscopic video tool in order for the Surgeon to manage tools and to perform intermediate tasks. Furthermore, rapid endoscope movement also corresponds to change in focus or scene. For example, a surgeon may linger on a single location while removing material, then rapidly change the endoscope position to the next location once the way is clear. Therefore, it is extremely useful to identify segments containing rapid endoscope movement and utilize them as natural video shot boundaries. This was done once again by a CNN to this time extract the feature vector of the CNN, creating 256-dimensional output. CNN was pretrained from Imagenet with no additional modifications necessary to the CNN weights or parameters.

Boundary Detection

After a feature vector was created for each frame, overall frame-by-frame differences were calculated through Euclidean L2 distance (see lower left panel of FIG. 7) where I represents the image feature vector at frame k and d is the distance between consecutive frames. Furthermore, a post-processing mean smoothing factor controllable by the user was used to provide a measure of mean frame distances and remove sudden outliers (example: water drops momentarily obscuring camera, etc). Time stamps with high mean frame distances then correspond to high scene motion. Finally, frames of highest movement are chosen one at a time until a user pre-defined limit is reached. To generate 3 minute videos as our result, n=27 frame boundaries were chosen. A temporal lockout was used to prevent extended scenes of high movement to be oversampled: A frame boundary was not chosen if it fell within a certain time of another boundary: a 'lockout time'. It was determined through expert feedback that Surgical procedures were not uniformly interesting. A typical ENT surgery has a long, careful approach section, with a lot of medically relevant actions happening closer to the end. Therefore, lockout times for frames were adjusted to be longer at the beginning than the end so that shot boundaries chosen at the end may be closer than boundaries at the beginning of a video. A weighting function was used to increase distance weights at the end of the video. The temporal lockout is a linear function that decreases from the beginning to the end of the video. Meanwhile, the weighting function is applied starting at 75% of the way through valid frames, and ramps linearly up to a weighting of 3× the original distance at the end of the video.

Video Frame Subshot Selection

For our implementation of video summarization, we chose to use subshot representativeness to dictate the best subshot. Once frame subshot boundaries are found, a clip length is specified by the user. The output of the CNN was taken to compare the L2 distance. First, the L2 Distance was calculated from each frame to each other frame within the shot. Since low L2 distance indicates that two frames are similar, the similarity of each frame to the overall video shot is taken as the mean of the similarity of each frame to each other frame. The subshot representativeness was then the sum of the similarity of each frame in a candidate clip (see equations at lower right panel of FIG. 7).

where R(k) is the "representativeness" of the clip starting at frame k, N is the total number of frames in the scene, and I is the feature vector at frame i. Finally, the best clip was chosen as the clip that had the maximum "representativeness" for each shot.

Standards of Comparison

In the following results section, we compare our method to two methods: First is comparing to the output of the purely commercial but general product.

Second, we compare to a pseudo-randomized method in which all non-Relevant scenes are removed. I.e. Sections 1.2.2 and 1.2.3 are satisfied, but no representative scenes and boundaries are detected. Instead, scenes are evenly temporally spaced and therefore random in the context of the surgical procedure.

Ground truth is determined in consultation with ENT medical experts. Each proposal video is manually annotated by medical experts to create a "gold standard" of performance based on the inclusion of key medical scenes from particular surgery in the video. Each scene is then evaluated according to this "gold standard": a grade of "1" for a certain key medical scene indicates that the scene is included in the automatic summary, "0.5" indicates partial inclusion (For example, a scene that shows fibrin glue after the action has taken place, but does not include the application directly), and "0" indicates that the scene is not included. These scenes may not match exactly. For example, "tumor resection" may include any number of scenes within a 20 minute window, and the specific scene chosen by the manual method and the automatic method need not overlap.

Results

Obscure Frame Removal

Blurry and External Patient

Tool-Less Frame Removal

Figure 10:
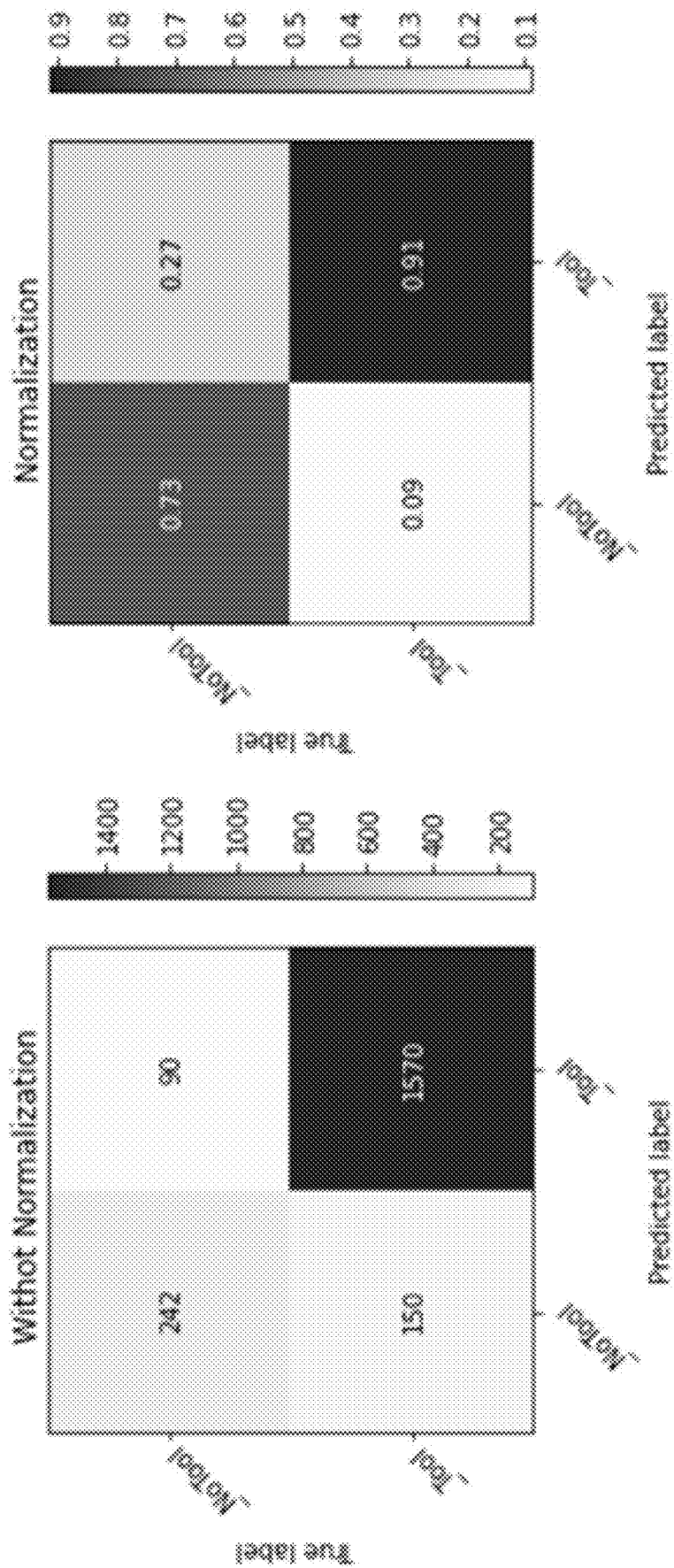
FIG. 10 depicts confusion matrices for prediction tools, according to an example embodiment.

After training of the stage 2 Convolutional Neural Network to identify frames containing tools, the result is shown in FIG. 10. Overall accuracy was 88%, with the majority of frames containing relevant tools.

Figure 11:
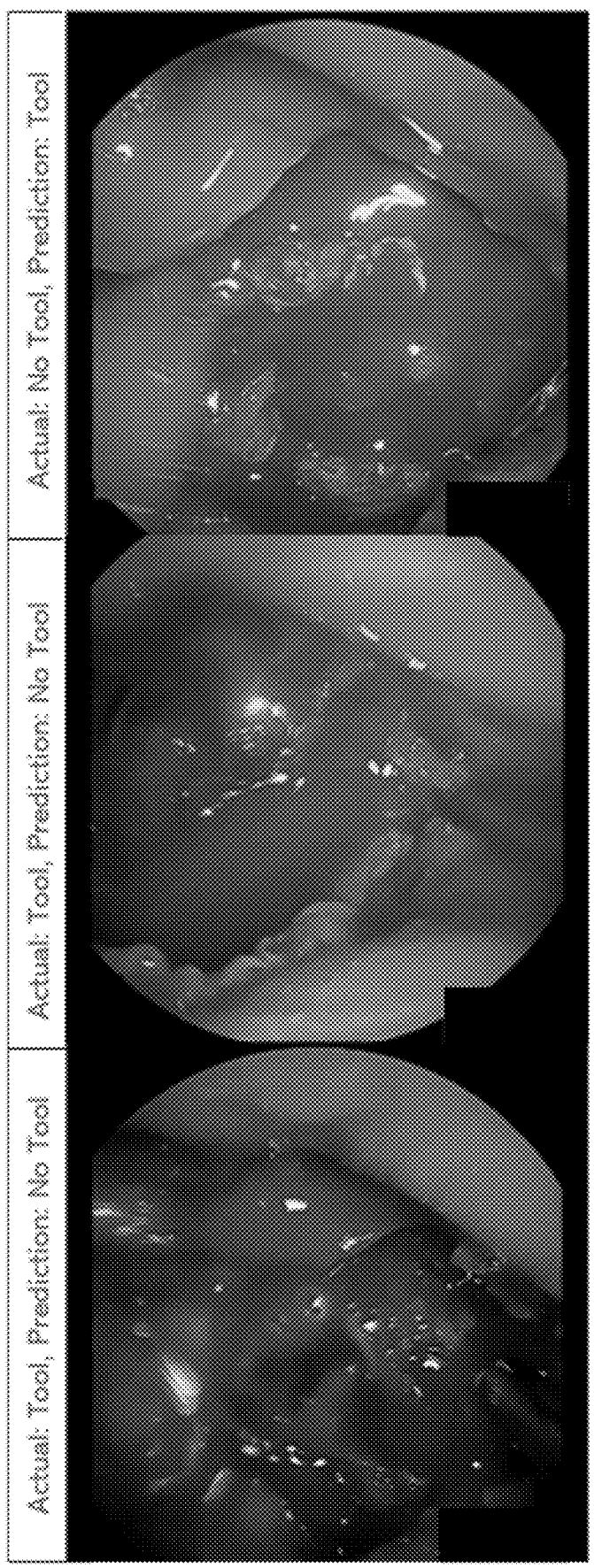
FIG. 11 depicts misidentified frames, according to an example embodiment.

Some misidentified frames are shown in FIG. 11. Even a human may have trouble detecting a tool in images at a glance, and such images often include lower frequency scenes or scenes in which the tool is occluded or difficult to identify. Such scenes would be poor selections for automatic summarizations.

Summarization Performance

With the non-relevant frames removed from the scenes, the video summarization tool takes over, cutting a high percentage of remaining material. FIG. 6 shows the overall flow. In tests, summarization cut 4 videos from an average of 163 minutes down to 3 minutes.

Time Reduction

Figure 12:
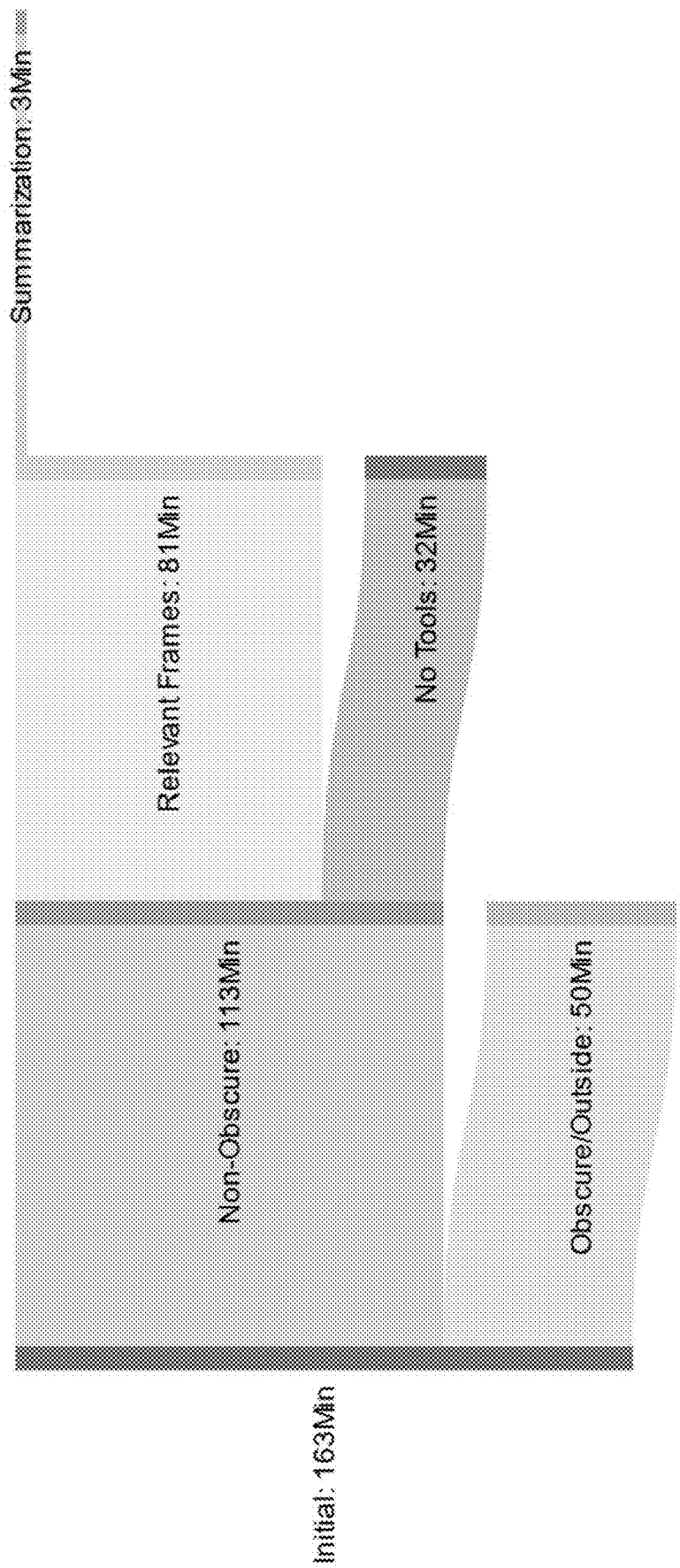
FIG. 12 shows a breakdown of each stage of a summarization process, according to an example embodiment.

FIG. 12 shows the breakdown of each stage of the summarization process. Irrelevant frames account for about 50% of overall video length, but 48% of frames must still be reduced in the summarization step. Overall, an average of 98% of video frames are removed to create a readable summary. Videos were condensed from an average of 163 minutes down to 3 minutes.

Frame Irrelevance

Performance of the frame classifier and Summarization can be quantified in many ways. The first of these ways is a metric we will define as 'Irrelevance', or ratio of irrelevant shots in a summary. Irrelevant shots are shots that do not add to an understanding of the surgical procedure, and were categorized by a medical expert. Typically, these shots contain blurry/static scenes missed by the CNN classifier and other such uninformative shots.

Irrelevance Ratio=(# Irrelevant Shots)/(Total Shots)

Although our method still includes frames that are not relevant to overall scene understanding, including several scenes of irrigation and static/uninteresting scenes, this only accounted for 13% of all frames. This is a vast improvement from (not designed or tuned for surgical video), which had 42% Irrelevant scenes.

See FIG. 13.

Medically Relevant Frame Sensitivity

In addition, our method outperformed the commercial application in finding specific medically relevant scenes. The results across 4 videos are shown in FIG. 14.

Overall, we have created an end-to-end automated surgical segmentation software that outperforms commercially available software on endonasal surgical videos.

Tool-Less Frame Removal was 88% accurate.

Medically Relevant Frame Sensitivity and Frame Irrelevance were drastically improved using our method over commercial methods, improving Irrelevance by 0.29 and key reference frame sensitivity by 0.51 when compared to the commercial product.

What is claimed is:

1. A method comprising:
   classifying, via a computational model, images of a source image stream as valid images or invalid images based on whether the images include biological tissue or a surgical tool, wherein classifying the images comprises identifying the valid images based on whether the valid images have at least a threshold level of clarity;
   generating a condensed image stream that includes the valid images;
   generating feature vectors for the valid images, wherein the feature vectors each characterize one of the valid images based on multiple criteria;
   identifying a subset of the valid images that corresponds to a phase of a surgical procedure by comparing the feature vectors; and
   generating metadata that identifies the subset of the valid images within the condensed image stream.

2. The method of claim 1, wherein the computational model was trained using input images labeled, by a clustering algorithm, as belonging to either a first group or a second group based on a hue, a saturation, or a brightness of the input images.

3. The method of claim 1, wherein the computational model was trained using input images labeled as including a surgical tool.

4. The method of claim 1, wherein the computational model was trained using input images labeled by a feature detection algorithm.

5. The method of claim 1, wherein classifying the images comprises classifying the images based on whether the images include the biological tissue and whether the images include a surgical tool.

6. The method of claim 1, wherein classifying the images comprises identifying the valid images based on the valid images including the biological tissue.

7. The method of claim 6, wherein identifying the valid images comprises identifying the valid images based on a level of a hue within the valid images that is associated with the biological tissue.

8. The method of claim 1, wherein classifying the images comprises identifying the valid images based on the valid images including a surgical tool.

9. The method of claim 1, wherein identifying the valid images based on whether the valid images have at least the threshold level of clarity comprises determining that the valid images have at least a threshold amount of features.

10. The method of claim 1, wherein comparing the feature vectors comprises applying a low pass filter to a pair of the feature vectors representing a pair of the valid images that are consecutive in time within the condensed image stream.

11. The method of claim 1, wherein comparing the feature vectors comprises identifying a distance between a consecutive pair of the feature vectors that exceeds a threshold distance.

12. The method of claim 11, wherein the consecutive pair is a first consecutive pair, and wherein comparing the feature vectors further comprises:
    identifying a second distance between a second consecutive pair of the feature vectors that exceeds a threshold distance, wherein the second consecutive pair chronologically follows the first consecutive pair; and
    confirming that a duration separating the first consecutive pair and the second consecutive pair exceeds a threshold duration.

13. The method of claim 12, wherein the threshold duration is a first threshold duration, wherein comparing the feature vectors further comprises:
    identifying a third distance between a third consecutive pair of the feature vectors that exceeds a threshold distance, wherein the third consecutive pair chronologically follows the second consecutive pair; and
    confirming that a second duration separating the second consecutive pair and the third consecutive pair exceeds the first threshold duration.

14. The method of claim 11, wherein the threshold distance is a first threshold distance and the consecutive pair is a first consecutive pair, wherein comparing the feature vectors further comprises identifying a second distance between a second consecutive pair of the feature vectors that exceeds a second threshold distance that is greater than the first threshold distance, wherein the second consecutive pair chronologically follows the first consecutive pair.

15. The method of claim 1, further comprising:
    receiving user input indicating a quantity of subsets,
    wherein identifying the subset of the valid images comprises identifying subsets of the valid images equal in number to the quantity of subsets.

16. The method of claim 1, further comprising:
    evaluating, for each image of the subset, distances between the image and each other image of the subset; and
    identifying a sub-segment of the subset of the valid images having a predetermined number of images and that has a minimum sum, a minimum median, or a minimum average of the distances.

17. The method of claim 1, wherein the computational model was trained using input images labeled, by a clustering algorithm, as belonging to either a first group or a second group based on a hue of the input images.

18. A computing device comprising:
    one or more processors; and
    a computer readable medium storing instructions that, when executed by the one or more processors, cause the computing device to perform functions comprising:
    classifying, via a computational model, images of a source image stream as valid images or invalid images based on whether the images include biological tissue or a surgical tool, wherein classifying the images comprises identifying the valid images based on whether the valid images have at least a threshold level of clarity;
    generating a condensed image stream that includes the valid images;
    generating feature vectors for the valid images, wherein the feature vectors each characterize one of the valid images based on multiple criteria;
    identifying a subset of the valid images that corresponds to a phase of a surgical procedure by comparing the feature vectors; and
    generating metadata that identifies the subset of the valid images within the condensed image stream.

19. The computing device of claim 18, wherein the computational model was trained using input images labeled, by a clustering algorithm, as belonging to either a first group or a second group based on a hue of the input images.

20. A non-transitory computer readable medium storing instructions that, when executed by a computing device, cause the computing device to perform functions comprising:
- classifying, via a computational model, images of a source image stream as valid images or invalid images based on whether the images include biological tissue or a surgical tool, wherein classifying the images comprises identifying the valid images based on whether the valid images have at least a threshold level of clarity;
- generating a condensed image stream that includes the valid images;
- generating feature vectors for the valid images, wherein the feature vectors each characterize one of the valid images based on multiple criteria;
- identifying a subset of the valid images that corresponds to a phase of a surgical procedure by comparing the feature vectors; and
- generating metadata that identifies the subset of the valid images within the condensed image stream.

\* \* \* \* \*